No. 662,905. Patented Dec. 4, 1900.
F. W. BANAN.
TOOL HOLDER AND WRENCH.
(Application filed Aug. 20, 1900.)
(No Model.)

Witnesses
O. M. Sibley
T. J. Field

Inventor:
Francis W. Banan

United States Patent Office.

FRANCIS W. BANAN, OF OAKLAND, MAINE.

TOOL-HOLDER AND WRENCH.

SPECIFICATION forming part of Letters Patent No. 662,905, dated December 4, 1900.

Application filed August 20, 1900. Serial No. 27,518. (No model.)

*To all whom it may concern:*

Be it known that I, FRANCIS W. BANAN, a citizen of the United States, residing at Oakland, in the county of Kennebec and State of Maine, have invented a new and useful Tool-Holder and Wrench, of which the following is a specification.

My invention relates to the manner of holding various tools, such as drills, bits, gimlets, and, in fact, any tool having a square tapering shank.

My object is to provide a simple, convenient, and rapid method of securely holding and quickly releasing such tools.

I attain my object by the mechanism illustrated in the accompanying drawings, in which similar letters refer to similar parts throughout the several views.

Figure 1:
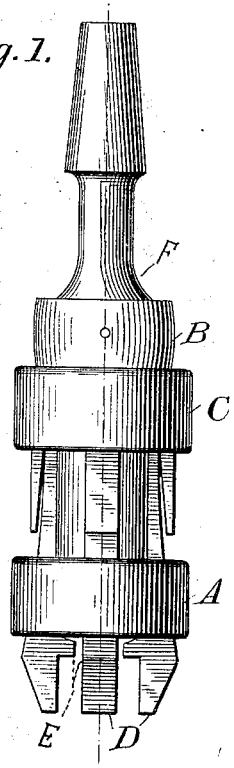
Figure 2:
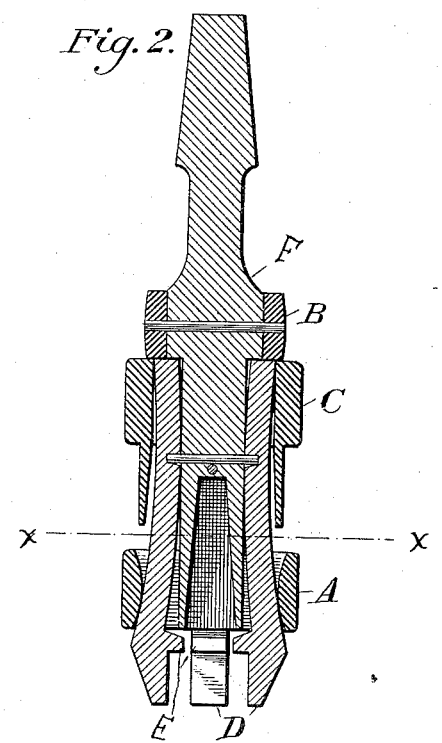
Figure 3:
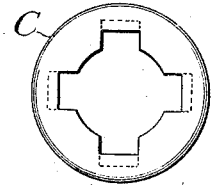
Figure 4:
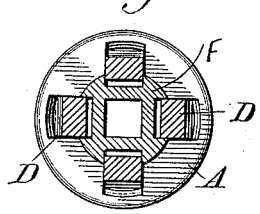

Figure 1 is a plan view of the entire device with sliding ring C raised to its highest point. Fig. 2 is a longitudinal sectional view showing curved jaws D, stationary rings A and B, sliding ring C, and square tapering socket in lower end of spindle F. Fig. 3 is an end view of sliding ring C, showing the grooves which partially inclose the curved jaws D. Fig. 4 is a cross-sectional view, taken on line X X, of lower end of device, showing stationary ring A, the ends of curved jaws D, their location in stationary ring A, and also showing the relation of curved jaws D to square socket in end of spindle F.

The curved jaws D rest in parallel grooves in each of four sides in spindle F and are kept from dropping down by the blind pins which enter holes drilled into the curved jaws. (See Fig. 2.)

The stationary rings A and B are made fast to spindle F by riveting or otherwise, while stationary ring A has grooves corresponding in number to grooves in spindle F, with their outer surface either tapering or curved, so as to receive the wedge-shaped projections which project downward from sliding ring C. The sliding ring C also has grooves similar to stationary ring A, and in addition has four wedge-shaped projections which project downward, which when ring C is pushed down to stationary ring A enter the grooves in ring A, thereby pressing lower ends of curved jaws D toward the center.

On the inner side of curved jaws D, and at a short distance from their lower ends, is a projection or boss E which, when the lower ends of jaws D are pressed toward the center, extends a short distance over the edge of square socket in spindle, thereby securely holding any tool that may be placed in the socket.

To operate the device, it is only necessary to place the tool in the socket and press the sliding ring C down as far as possible, when the wedge-shaped projections projecting downward from ring C will have entered the tapering or curved grooves in stationary ring A, thereby pressing the lower ends of curved jaws D in toward the center, which will securely hold any tool which may be placed in the socket, and to remove or release the tool it is only necessary to slide ring C up to its highest point, when the tool may be easily removed.

The square receptacles in lower ends of jaws D form an admirable and perfect wrench and is operated in the same manner as though a tool were placed in the socket.

I am aware that spindles similar to spindle F have been in use for a long time, and I make no claim to that feature; but

What I claim, and desire to secure by Letters Patent, is—

In a tool-holder, the spindle F having parallel grooves, in which rest the curved jaws D, the jaws D carrying the boss E, in combination with the sliding ring C having wedge-shaped projections projecting downward, and of a size, and shape, suitable for entering tapering grooves in stationary ring A, as and for the purpose specified.

FRANCIS W. BANAN.

Witnesses:
O. M. SIBLEY,
T. J. FIELD.